United States Patent [19]

Fischer et al.

[11] 4,268,133

[45] May 19, 1981

[54] PREFERENTIAL ORIENTATION OF CONTACT LENSES

[75] Inventors: David J. Fischer, Sarasota; Idella B. Wooten, Bradenton; John C. Thomas; James A. Reid, both of Sarasota, all of Fla.

[73] Assignee: Bausch & Lomb Incorporated, Rochester, N.Y.

[21] Appl. No.: 84,055

[22] Filed: Oct. 11, 1979

Related U.S. Application Data

[63] Continuation of Ser. No. 924,719, Jul. 14, 1978, abandoned.

[51] Int. Cl.³ .................................................. G02C 7/04
[52] U.S. Cl. .................................................. 351/161
[58] Field of Search ................ 351/160 R, 160 H, 161

[56] References Cited

U.S. PATENT DOCUMENTS

| | | | |
|---|---|---|---|
| 2,133,498 | 10/1938 | Dittmer | 351/160 |
| 3,833,786 | 9/1974 | Brucker | 351/160 |
| 4,095,878 | 6/1978 | Fanti | 351/161 |

Primary Examiner—John K. Corbin
Assistant Examiner—Scott J. Sugarman
Attorney, Agent, or Firm—Robert M. Phipps; Frank C. Parker

[57] ABSTRACT

An improved contact lens and method of forming the same which causes the lens to adopt and maintain a particular angular orientation upon the eye of a wearer. One or more characters are formed in relief upon a surface of the lens at a point which is intended as the topmost point in the lens when properly oriented. The relieved characters may be used alone or in combination with previously-known means for effecting orientation of the lens.

20 Claims, 10 Drawing Figures

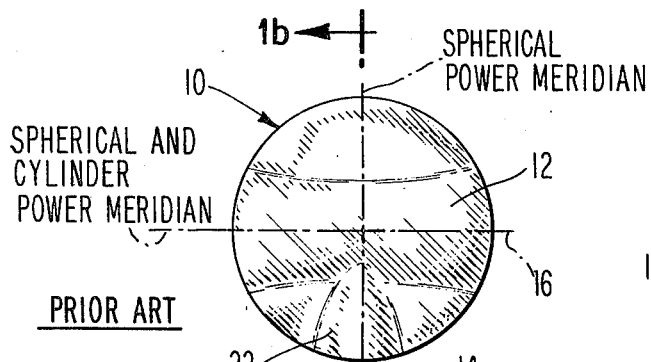
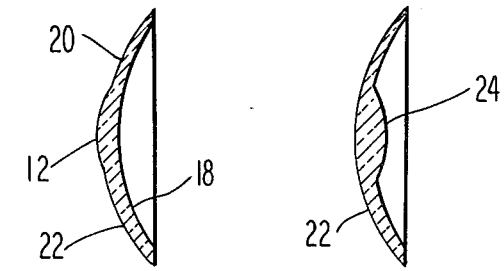
Fig.1a  Fig.1b  Fig.1c
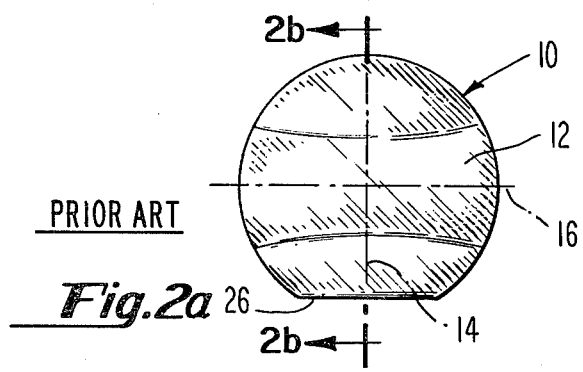
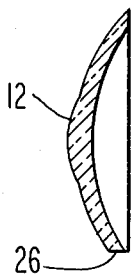
Fig.2a  Fig.2b
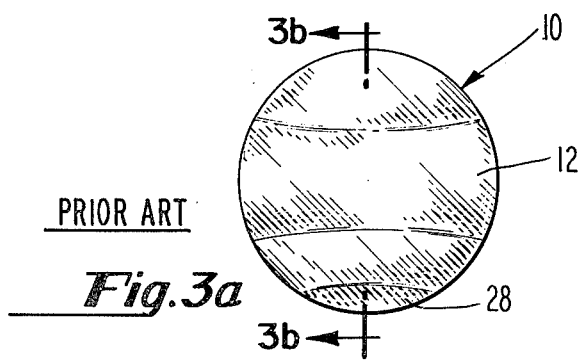
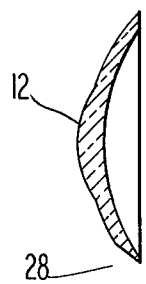
Fig.3a  Fig.3b
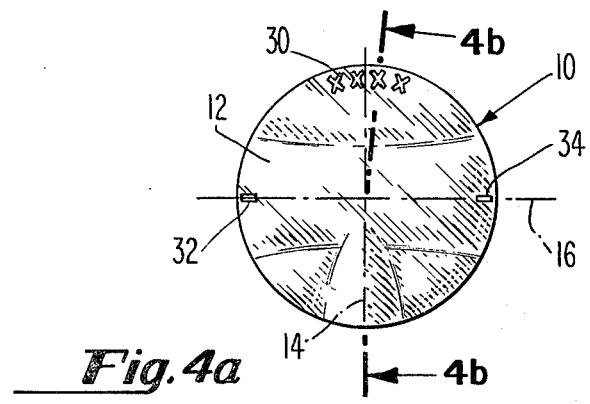
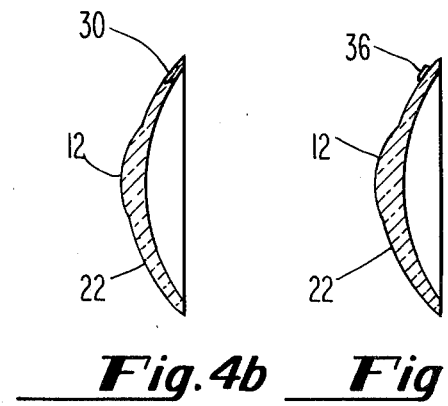
Fig.4a  Fig.4b  Fig.4c

PREFERENTIAL ORIENTATION OF CONTACT LENSES

CROSS REFERENCE TO RELATED APPLICATION

This is a continuation of application Ser. No. 924,719, filed Jul. 14, 1978, now abandoned.

BACKGROUND OF THE INVENTION

The present invention relates to contact lenses, and in particular to an improved means by which the angular orientation of the lens upon the eye of a wearer can be maintained.

Contact lenses, i.e. transparent lenses worn directly upon the surface of the eye, have long been known in opthalmology. Although various types of contact lenses are presently known and used, they are generally catergorized as "hard" or "soft" lenses. Of these two types, the so-called "hard" contact lenses are presently better known and have been in use longer. Such lenses may be formed of numerous substances, but are commonly formed of crosslinked polymethylmethacrylate and other polymeric materials. The so-called "hard" contact lenses are substantially smaller than the cornea of the eye.

The newer, "soft" contact lenses may be formed of many materials including hydroxyethylmethacrylate, metallo-organic substances, silicone rubbers, and various other polymers such as disclosed in U.S. Pat. No. 3,503,942 and 3,639,524—Seiderman et al. Many of the soft contact lenses currently in use are hydrophilic, that is, they absorb water and, in fact, the water becomes an integral part of their structure. All of the so-called "soft" contact lenses exhibit much greater flexibility than "hard" contact lenses and can undergo considerable distortion and subsequently return to their original configuration. Hard contact lenses, on the other hand, are comparatively rigid. Another distinction between the "hard" and "soft" types of lenses is that the soft lenses are commonly much larger, ordinarily being of sufficient diameter to cover the cornea of a wearer's eye.

Spherical contact lenses of both hard and soft types are in the majority. The optical power of the lens does not vary either radially or circumferentially about the optic axis of such lenses, so that they may be rotated at any angle without changing the optical effect upon a wearer.

As is well known to those skilled in the art, certain types of defects in the eye can only be corrected by lenses which are not spherical. For instance, to effectively correct for astigmatism an ophthalmic lens must exhibit a cylindrical characteristic so that rays of light are preferentially directed in certain planes. Also, presbyopia is commonly corrected by means of "bifocal" ophthalmic lenses which exhibit different optical properties at different portions thereof.

Providing cylindrical, bifocal or multifocal characteristics in a lens causes systematic deviations from spherical symmetry. This may be done to correct for conditions in the optical elements of the eye, i.e. the cornea and the crystalline lens, in that they do not comprise spherical surfaces. The latter condition, termed astigmatism, can be corrected with lenses by complementing the aspherical nature of cornea and natural lens in the eye.

One form of lens used to correct the astigmatic eye is a lens which has the meridians of least and greatest curvature located at right angles to one another on the same surface. This is designated as a toroidal surface and a lens having such a surface is referred to as a toric lens.

Various forms of contact lenses may be used to correct for presbyopia. All such lenses exhibit different optical properties in at least two different portions of the lens. Many such lenses are not spherical and must, therefore, be maintained at a specific orientation with respect to the meridians of the eye.

When spectacles are worn, proper orientation of the meridians of a toric lens with respect to the eye is not a problem inasmuch as the rigid frame of the spectacles holds the lens in the proper orientation. With contact lenses, however, there is no such rigid mechanism or frame to hold the lens in place. Vertical and lateral location of the lens is generally maintained by fitting the curvature of the cornea. An optimum fitted spherical contact lens will rotate during wear without any loss in visual acuity. A toric or otherwise spherically asymmetrical lens, to be effective, must not rotate.

Angular orientation of a well-fitted contact lens is difficult to achieve. Various approaches have been devised in an attempt to cause contact lenses to maintain a preferred orientation upon the eye. Such approaches have generally comprised modifications to the physical form of lens structure. These approaches often place undue constraints upon the shape of the lenses, and in some cases may restrict the prescription of the lens. Therefore, efforts to achieve preferential orientation of contact lenses have not been universally successful. In fact, often configurations which provide preferential orientation and good visual acuity for some individuals will not do so for others.

It will therefore be seen that it is highly desirable to provide a universal means and method for causing a spherically asymmetrical contact lens to consistently maintain a given preferential angular orientation on the eye of a wearer.

It is therefore an object of the present invention to provide an improved contact lens which achieves and maintains a preferred angular orientation upon the cornea of the eye.

Another object of the present invention is to provide a method for achieving a predetermined angular orientation of a spherically asymmetrical contact lens upon the cornea of the eye.

Yet another object is to provide a contact lens which consistently achieves a predetermined angular orientation.

Still another object is to provide a means for achieving a given angular orientation of a contact lens at a predetermined angle, without regard to the specific curvature of the lens.

SUMMARY OF THE INVENTION

Briefly stated, in accordance with one aspect of the invention, the foregoing objects are achieved by providing one or more characters formed in relief at a point upon the lens which is desired to be maintained at the top when in use, generally aligned with the 90th meridian of the eye. According to a presently preferred embodiment of the invention, such characters are formed in recessed relief by directing a beam of radiation from a laser upon a surface of the lens to sublime lens material to a controlled depth, in accordance with a pattern defined by a mask or the like.

According to a presently preferred embodiment of the invention, supplementary lens material is disposed to form a prism ballast at a point substantially opposite the location of the relieved characters.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawing in which:

FIGS. 1a-1c are front and side views, respectively, of a toric contact lens adapted to achieve preferred orientation;

FIGS. 2a and 2b are front and side views, respectively of a toric contact lens adapted to achieve preferred orientation;

FIGS. 3a and 3b are front and side views, respectively, of a contact lens showing still another approach to achieving preferred orientation; and FIGS. 4a-4c are front and side views, respectively, of a contact lens embodying teachings of the present invention.

DESCRIPTION OF A PREFERRED EMBODIMENT

In FIGS. 1a through 1c, there is depicted an example of the toric type of contact lens. The lens body indicated at 10 comprises a spherical component, a cylindrical component and has incorporated therein a prism 22. The toricity is formed by incorporating a cylindrical surface which extends transversely across lens 10 and is perpendicular with meridian 14 which is termed the cylindrical axis.

Meridian 16 is termed the total power meridian. Inasmuch as these terms are conventional in ophthalmology, they do not require further explanation except to point out that the toric cylinder axis 14 may be oriented at any angular position across the body of the lens. In the illustrated example, meridians 16 and 14 correspond to the horizontal and 90th meridian of the optical system, respectively. It will be recognized by those skilled in the art that the optic axis of the lens arises perpendicularly to meridians 14 and 16 and extends through their intersection, normally the geometric center of the lens.

Inasmuch as the base curve 18 of lens 10 describes a spherical component of the lens surface, it will be appreciated that the toric surface 12 approximates a spherical surface which in turn is curved generally in conformity with the base curve of the lens. A curved surface, combining sphere and cylinder, is properly considered a toric surface and hence the use of the term "toric" to describe the lens configuration.

As is familiar to those skilled in the art, astigmatism in the eye results from an asymmetry resulting in the unequal refraction of incident light in meridians lying at right angles to each other. By convention these meridians, which are imaginary lines extending through the geometric center of the cornea of the eye, are known as the principal meridians of the eye. In similar fashion, a corrective optical system also exhibits principal meridians lying 90° apart. The spherical part of a toric lens has the same power in all meridians. The cylindrical part of a toric lens has a maximum power in one meridian, termed the total power meridian, and substantially no optical power in the meridian 90° away, termed the cylinder axis. A toric lens incorporates both spherical and cylindrical components into one composite lens.

In order to correct astigmatism, the power of the corrective lens must complement that of the eye. Consequently, the principal meridians of the correcting lens must match the principal meridians of astigmatic error of the eye. Since the principal meridians of an astigmatic eye may lie at any arbitrary angle with respect to the zero or horizontal meridian of the eye, it will be apparent that the principal meridians of the toric corrective lens are required to lie at the same angle to provide the best visual acuity. Hence meridians 16 and 14 in FIG. 1a need not lie in horizontal and vertical planes, respectively, but may be disposed at any angle depending upon the correction necessary for the eye. Of course, the principal meridians will always lie at right angles to one another.

FIG. 1b further illustrates the configuration of the lens 10. The interior surface 18 of the lens may be a regular curve, adapted to mate closely with the surface of the eye. The front surface 20 of the lens is formed in an appropriate configuration for correcting deficiencies in the eye, and includes toric surface 12 of which the cylindrical power meridian 16 is shown to extend horizontally across the outer surface of the contact lens. It should be appreciated that lens configurations other than toric may be selected, depending upon the specific deficiency to be corrected. For example the lens may be provided with bifocal or multifocal lens configurations which are not "toric" in the strict sense. Still other configurations may be adapted and it is intended that the present invention encompasses any contact lens configuration wherein the optical power of the lenses varies radially and circumferentially about the optic axis so that the lens must be oriented at a particular angle with respect to the 90th meridian of the wearer's eye.

Since the optical properties of such lenses are not circumferentially uniform, it is necessary that the illustrated lens maintain the correct angular position upon the eye. As there is no rigid structure with which to position the lens, efforts have been made to change the physical structure of the lens to cooperate with the eye to prevent its rotation and maintain the principal meridians of the lens in proper relationship with those of the eye.

With one prior art approach, additional mass is provided at one side of the lens, specifically the side which is to be maintained at the bottom of the eye or, to use conventional notation, at the lower end of the 90th meridian. Such additional mass is termed prism ballast and is depicted in FIG. 1b as the thickened section 22 at the lower portion of the lens. A prism ballast is conventionally formed by machining or molding a lens off center. As its name implies, the mass of the material tends to act as a ballast, and the force of gravity tends to rotate the lens until the center of the ballast is at the lower part of the eye.

In FIG. 1c, there is shown a lens construction termed a back surface toric lens wherein a toric surface 24 is incorporated on the inner surface of the lens. The lens illustrated in FIG. 1c also exhibits a prism ballast 22. While the base down prism, or prism ballast, has achieved some measure of success, it has been found that it is not always effective.

FIGS. 2a and 2b illustrate another form of an orienting mechanism used for contact lenses. A lens body 10 is provided with a toric surface 12 as in FIG. 1, and exhibits principal meridians 14 and 16, respectively. For present purposes it will be assumed that the cylinder axis 14 corresponds with the vertical meridian of the eye.

In order to orient the lens properly, the lower portion of the lens is truncated, terminating along a generally flat surface 26. As can be seen in FIG. 2b, surface 26 extends outwardly from the surface of the eye and is adapted to rest upon the lower lid of the lens wearer. In theory, the truncation will rest upon the lower lid of the eye and will serve to prevent rotation of the lens, thus maintaining the desired alignment of the principal meridian of the lens and the eye. However, in practice this frequently does not happen and the lens rotates or becomes displaced. Double truncation, that is, upper and lower parallel truncations for abutting the upper and lower eyelids, have been tried but still do not provide the necessary degree of orientation and comfort.

Turning now to FIGS. 3a and 3b, there is shown still another approach to securing orientation of a contact lens. In the illustrated embodiment, a chamfered zone 28 is formed upon the front surface of the lens. The purpose of the chamfered zone, like that of truncated surface 26, is to interact with the edge of the lower eyelid and resist rotation of the contact lenses. As was true with the truncated lens of FIGS. 2a and 2b, a second chamfered zone may be formed at the upper edge of the lens, for interacting with the upper eyelid in order to provide still further assistance to aligning the lens. As was the case with prism ballast and truncations, however, it has been found that chamfered zones upon a contact lens frequently do not maintain the angular orientation of the lens. Further, no reliable method has been discovered for predicting when chamfered zones will work satisfactorily, and accordingly the use of such zones for locating contact lenses remains a hit or miss situation.

Referring now to FIG. 4a there is shown a spherocylindrical contact lens embodying principles of the present invention, and which has been found to provide superior alignment characteristics without requiring significant additions or deletions of mass to the lens. In particular, the present inventors have discovered that by providing one or more characters 30 as depressions or elevations in relief upon a surface of the lens, the lens will consistently achieve a predictable orientation upon the front surface of the eye. More particularly, it has been found that when a lens having such characters inscribed near the periphery thereof is placed on the eye, the lens ultimately assumes an orientation wherein the characters are at the uppermost side of the lens, corresponding to the 90th meridian of the eye. In the illustrated embodiment of FIG. 1, the principal meridians 16 and 14 of the lens are to be disposed along the horizontal and 90th meridians, respectively, of the eye of a wearer. It will be recognized, however, that the angular orientation of the principal meridians is determined by the requirements for the orientation of the principal meridians of the astigmatic correction for the eye to which the lens is to be fitted.

In order to effect correct alignment of a contact lens, it is then necessary to determine where the cylindrical axis of the lens will lie with respect to the 90th meridian of the eye. When the angle, 0, between the cylindrical axis of the lens and the 90th meridian of the eye is determined one or more characters 30 are then inscribed at a location on the lens displaced at the same angle 0 from the cylindrical axis of the lens. If a single character is to be used, the character should then be centered upon the point corresponding to the 90th meridian. If more than one character is used, it is preferable that the characters be centered about the point in the manner shown in FIG. 4a.

Although it has been found that the specific form of the relief character is not critical to the practice of the present invention, in a presently preferred embodiment the characters are formed generally in accordance with the letter "X," substantially as shown. In addition, tests have shown that a set of fours X's provide satisfactory orientation. It should be recognized, however, that the term "character" is meant to encompass any and all types of markings including lines, circles, alphanumeric characters, geometric designs and the like. The character should be disposed outside the effective optical zone of the lens, adjacent the lens perimeter as shown in FIG. 4a. In one successfully tested embodiment the characters exhibited a height of approximately 0.50 mm, width of 0.35 mm and were formed by recessed reliefs, or grooves approximately 0.025 mm deep. As was true with respect to the height and configuration of the characters, it is not believed that the depth thereof is critical to the practice of the present invention. The word "relief" as used herein means a character formed at an elevation either above or below the surrounding lens surface. Accordingly, a "relief" or "relieved character" comprises both raised reliefs and recessed reliefs.

In a successfully tested embodiment of the invention, the relieved characters were formed by sublimating or vaporizing the lens material with a beam of electromagnetic energy from a laser. The laser beam was directed through a mask which defined the characters, and was applied for a brief period of time, here characterized as a "burst" of energy. Apparatus adapted for practicing this method and a further discussion of the method itself is set forth in co-pending U.S. patent application Ser. No. 850,133 now U.S. Pat. No. 4,194,814 granted Mar. 25, 1980 filed Nov. 10, 1977 and entitled "Means and Method for Making Transparent Ophthalmic Contact Lenses." The disclosure of the latter patent application is incorporated herein by reference. As more fully disclosed in the aforementioned application Ser. No. 850,133 now U.S. Pat. No. 4,194,814 granted Mar. 25, 1980, by controlling the intensity and duration of the burst of radiation the depth of sublimation of characters can be controlled. Further, and although not a preferred approach, it is contemplated that characters may be formed by other processes such as chemical or mechanical etching, by molding the characters into a cast lens, or by scribing with a stylus or the like.

An additional pair of characters 32 and 34 may be formed in the lens surface along a line which corresponds to the horizontal meridian of the eye of the wearer. The purpose of marks 32 and 34 is simply to assist a fitter in placing the lens in the eye, and for observing movement of the lens upon the surface of the eye. In this connection, it will be appreciated by those skilled in the art that contact lenses of the "soft" type are ordinarily of such a size that the upper and lower edges of the lens lie beneath the upper and lower eyelids, respectively, of a wearer and accordingly characters 30 are obscured from view. For this reason, marks 32 and 34 are helpful in fitting a lens and monitoring its position.

Inasmuch as the formation of characters 30 upon a contact lens has no effect upon the contour of the lens, other means for securing preferential orientation of the lens may be used in conjunction with the relief characters. FIG. 4b illustrates the use of characters 30 in conjunction with a prism ballast 22 formed upon the lens in the usual manner. Characters 30 may also be provided in addition to single or double lens truncation or single or double chamfered zones as shown in FIGS. 3a and 3b. Experiments have demonstrated, however, that the most effective combination is that of one or more relieved characters along with a prism ballast, substantially as shown in FIG. 4b.

While in a preferred embodiment characters 30 are formed upon the front surface of a contact lens, substantially as shown in FIG. 4b, it is also possible to form the characters on the back of the lens and near the periphery thereof. Such a lens would have an appearance substantially as shown in FIG. 4a due to the transparency of the lens. Since the lens material is homogeneous, the manner of forming the relieved characters is the same regardless of the surface of the lens which is selected; again, however, in a presently preferred embodiment the use of the laser and mask arrangement as shown in co-pending application Ser. No. 850,133 now U.S. Pat. No. 4,194,814 granted Mar. 25, 1980 is preferred.

Referring now to FIG. 4c, there is shown another embodiment of the present invention in which characters 36 are formed in raised, rather than recessed, relief. Characters 36 may be formed by using a mold in which a cast lens is to be produced.

While it is possible to provide characters 36 in relief on the back of the lens, in a presently preferred form they are on the front surface substantially as shown, and oriented about a point corresponding with the 90th meridian of the eye of the wearer. In addition, characters 36 may advantageously be used in combination with prism ballast 22 for further insuring that consistent preferential orientation of the lens has been achieved.

From the foregoing it will be seen that there has been provided a means and method for causing a contact lens to consistently maintain a preferential orientation upon the eye of a wearer. Accordingly, and as is evident from the foregoing description, certain aspects of the invention are not limited to the particular details of the examples illustrated. It is therefore intended that the appended claims shall cover all such modifications and applications as do not depart from the true spirit and scope of the invention.

What is claimed as new and desired to be secured by Letters Patent of the United States is:

1. A soft contact lens having an optical power which varies radially and circumferentially about the optic axis of the lens comprising at least one character formed in relief upon a surface of the lens, said character being disposed in the peripheral portion of the lens adjacent the periphery without intersecting the periphery and symmetric about the 90th meridian thereof for causing said lens to maintain a predetermined orientation upon the eye of a wearer, said character being substantially smaller than the effective optical zone of the lens.

2. The soft contact lens according to claim 1, wherein at least one of said character is formed in the front surface of said lens.

3. The soft contact lens according to claim 1, wherein at least one of said character is formed in the back surface of said lens.

4. The soft contact lens according to claim 1, wherein the mass of said lens is displaced to comprise a prism ballast having a center of gravity disposed substantially 180° from said point.

5. The soft contact lens according to claim 1, wherein said lens is truncated, said truncation being disposed substantially 180° from said point.

6. The soft contact lens according to claim 1, wherein at least one of said character is formed in recessed relief.

7. The soft contact lens according to claim 6, wherein said character is about 0.35 mm wide and about 0.025 mm deep.

8. A contact lens adapted to be disposed upon the surface of the eye, said lens having a predetermined asymmetric surface defined as a combination of sphere and cylinder, said cylinder to have a predetermined orientation upon the eye, including means for maintaining the orientation of said lens upon the eye comprising at least one character formed in relief and disposed upon the surface of said lens and in the peripheral portion of the lens and adjacent the periphery without intersecting the periphery, said character being small in size as compared to the effective optical area of said lens.

9. The contact lens according to claim 8, wherein said contact lens comprises a prism ballast formed of the lens material and disposed substantially opposite at least one of said character.

10. The contact lens according to claim 8, wherein said lens is truncated to form a surface disposed substantially opposite at least one of said character.

11. The contact lens according to claim 8, wherein the front surface of said lens exhibits toricity.

12. The contact lens according to claim 8, wherein the back surface of said lens exhibits toricity.

13. The contact lens according to claim 8, wherein at least one of said character is formed by forming a beam of electromagnetic radiation from a laser and directing said beam upon the surface of said lens for sublimating said lens material to a controlled depth.

14. The contact lens according to claim 8, wherein at least one of said character is formed in the front surface of said lens by molding.

15. The contact lens according to claim 8, wherein at least one of said character is formed in the back surface of said lens by molding.

16. The contact lens according to claim 8, wherein at least one of said character is formed in the front surface of said lens by scribing.

17. The contact lens according to claim 8, wherein at least one of said character is formed in the back surface of said lens by scribing.

18. A method of fabricating a soft contact lens which will maintain the axis of cylindrical correction in the lens in a predetermined orientation upon the eye of the wearer with respect to the 90th meridian of the eye comprising the steps of forming at least one relief character disposed in the peripheral portion of the lens adjacent the periphery without intersecting the periphery and at a point corresponding to the 90th meridian of the eye.

19. The method according to claim 18, wherein at least one of said character exhibits an x-shape.

20. The method according to claim 18, wherein at least one of said character comprises a plurality of x-shaped characters disposed symmetrically about a point to be located at the 90° meridian of the eye.

* * * * *